United States Patent
Gaknoki et al.

(10) Patent No.: US 8,634,213 B2
(45) Date of Patent: Jan. 21, 2014

(54) POWER SUPPLY CIRCUIT WITH A CONTROL TERMINAL FOR DIFFERENT FUNCTIONAL MODES OF OPERATION

(71) Applicant: Power Integrations, Inc., San Jose, CA (US)

(72) Inventors: Yury Gaknoki, San Jose, CA (US); Tiziano Pastore, Los Gatos, CA (US); Mingming Mao, Cupertino, CA (US); David Michael Hugh Matthews, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

(21) Appl. No.: 13/670,302

(22) Filed: Nov. 6, 2012

(65) Prior Publication Data

US 2013/0070488 A1 Mar. 21, 2013

Related U.S. Application Data

(63) Continuation of application No. 12/658,479, filed on Feb. 10, 2010, now Pat. No. 8,310,845.

(51) Int. Cl.
*H02M 3/335* (2006.01)

(52) U.S. Cl.
USPC .................. 363/21.17; 363/21.07; 363/21.09; 363/21.15

(58) Field of Classification Search
USPC ...................... 363/21.07, 21.09, 21.15, 21.17
See application file for complete search history.

(56) References Cited

U.S. PATENT DOCUMENTS

| | | | |
|---|---|---|---|
| 6,577,512 B2 * | 6/2003 | Tripathi et al. | 363/21.17 |
| 7,295,451 B2 * | 11/2007 | Charles | 363/21.15 |
| 7,999,606 B2 | 8/2011 | Kung et al. | |
| 8,125,265 B2 | 2/2012 | Kung et al. | |
| 8,278,994 B2 | 10/2012 | Kung et al. | |
| 8,373,356 B2 * | 2/2013 | Shao et al. | 315/291 |
| 2010/0109561 A1 * | 5/2010 | Chen et al. | 315/294 |
| 2010/0194445 A1 * | 8/2010 | Balakrishnan et al. | 327/108 |
| 2011/0149615 A1 * | 6/2011 | Matthews | 363/21.12 |
| 2013/0020964 A1 * | 1/2013 | Nuhfer et al. | 315/291 |

* cited by examiner

*Primary Examiner* — Adolf Berhane
*Assistant Examiner* — Emily P Pham
(74) *Attorney, Agent, or Firm* — The Law Offices of Bradley J. Bereznak

(57) ABSTRACT

A method of operation for flyback power converter includes operating a controller of the flyback power converter in a regulation mode when a control signal is below a first threshold. The control signal is provided as an input to a terminal of the flyback power converter. When the control signal is below a second threshold and above the first threshold, the controller is operated in a limiting mode. The controller is operated in an external command mode when the control signal is below a third threshold and above the second threshold. Lastly, when the control signal is above the third threshold, the controller is operated in a protection mode.

7 Claims, 5 Drawing Sheets

POWER SUPPLY CIRCUIT WITH A CONTROL TERMINAL FOR DIFFERENT FUNCTIONAL MODES OF OPERATION

This application is a continuation of application Ser. No. 12/658,479, filed Feb. 10, 2010, now U.S. Pat. No. 8,310,845, which application is assigned to the assignee of the present application

TECHNICAL FIELD

The present disclosure generally relates to the field of electronic circuitry. More particularly, the present disclosure relates to switching power converters that deliver a regulated output current to a load.

BACKGROUND

Electronic devices use power to operate. Switching power converters are commonly used due to their high efficiency, small size and low weight to power many of today's electronics. Conventional wail sockets provide a high voltage alternating current. In a switching power converter a high voltage alternating current (ac) input is converted to provide a well regulated direct current (dc) output through an energy transfer element. The switching power converter typically includes a controller that provides output regulation by sensing the output and controlling it in a closed loop. In operation, a power switch is utilized to provide the desired output by varying the duty cycle (typically the ratio of the time the power switch is able to conduct current over a certain time period) of the switch to control the transfer of energy between the input and the output of the power converter. The controller of the power converter may provide output regulation by adjusting the duty cycle of the power switch in response to sensing the output. In operation, the switch may produce a pulsating current having a frequency regulated by the controller to produce a substantially constant output current at the load.

In one example, a controller of a switching power converter may be designed to perform a power factor correction and regulation. More specifically, power factor correction allows for the input current to proportionately change with the ac input voltage to increase power efficiency. In many power converter circuits, the power factor correction feature that is included may require the controller to operate in different control modes to achieve optimal efficiency while regulating within a certain tolerance. A drawback of this approach, however, is that the inclusion of multiple control modes must be implemented with additional inputs which may increase the need for additional pins on the controller of the power converter, thus increasing the cost of the controller.

BRIEF DESCRIPTION OF THE DRAWINGS

The subject matter of the present disclosure is illustrated by way of example, and not limitation, in the figures of the accompanying drawings, wherein.

DESCRIPTION OF EXAMPLE EMBODIMENTS

Figure 1:
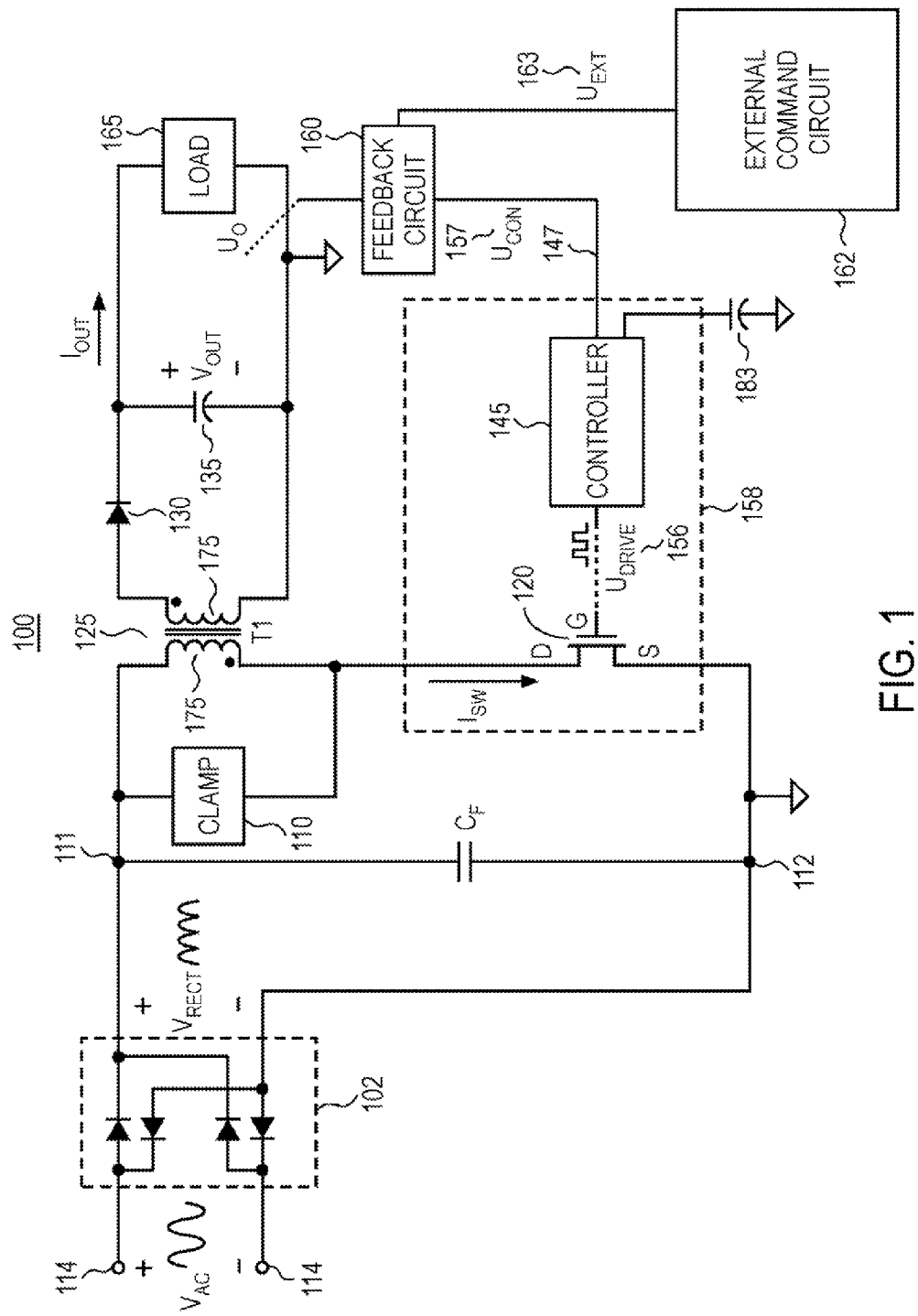
FIG. 1 illustrates an example circuit block diagram of a switching power converter circuit configured to deliver a regulated output current to a load.

Embodiments of a temporary feedback terminal are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

In the following description specific details are set forth, such as device types, voltages, component values, configurations, etc., in order to provide a thorough understanding of the embodiments described. However, persons having ordinary skill in the relevant arts will appreciate that these specific details may not be needed to practice the embodiments described. It is further appreciated that well known circuit structures and elements have not been described in detail, or have been shown in block diagram form, in order to avoid obscuring the embodiments described.

Reference throughout this specification to "one embodiment" or "an embodiment" means that a particular feature, structure, or characteristic described in connection with the embodiment is included in at least one embodiment of the present invention. Thus, the phrases "in one embodiment" or "in an example embodiment" in various places throughout this specification do not necessarily refer to the same embodiment. Furthermore, the particular features, structures, or characteristics may be combined in any suitable manner (e.g., combinations and/or sub-combinations) in one or more embodiments.

A controller of a power converter with a control terminal that receives inputs to indicate multiple functions is disclosed. In one mode of operation, the control terminal receives a control signal with a certain value that indicates a feedback control such that the controller may regulate the output current of the power converter at a certain value while implementing power factor correction. In another mode of operation, the control terminal may receive a control signal with a certain value that indicates a cycle by cycle control that allows the output current to be limited to a maximum value. While implementing a cycle by cycle control, controller gives up power factor correction. In another mode of operation, the control terminal may receive a control signal with a certain value to indicate that the controller perform in response to an external command signal. In one example, the external signal may implement a pulse width modulation (PWM) dimming control which allows the output current to be delivered to the load (e.g., one or more LEDs) for only a percentage of the time. During this operation the controller inhibits switching of the power switch or may switch the power switch at a fixed rate independently of regulating the output current of the power converter. In other words, the controller receives a signal to operate in an open loop control mode in response to an external signal. In yet another mode, the control terminal may receive a control signal with a certain value to indicate that the controller perform a protection mode of operation to shut down the power supply and permanently prevent switching of the power switch.

In the context of the present application, when a transistor is in an "off state" or "off" the transistor does not substantially conduct current. Conversely, when a transistor is in an "on state" or "on" the transistor is able to substantially conduct current. By way of example, in one embodiment, a high-voltage transistor comprises an N-channel metal-oxide-semiconductor field-effect transistor (MOSFET) with the high-voltage being supported between the first terminal, a drain, and the second terminal, a source. The high voltage MOSFET comprises a power switch that is driven by an integrated controller circuit to regulate energy provided to a load. For purposes of this disclosure, "ground" or "ground potential" refers to a reference voltage or potential against which all other voltages or potentials of an electronic circuit or Integrated circuit (IC) are defined or measured.

As shown, FIG. 1 illustrates an example block diagram of a switching power converter circuit 100 (i.e., a power converter) configured to deliver a constant output current $I_{OUT}$ to a load 165. As shown, the topology of switching power converter 100 illustrated in FIG. 1 is that of a flyback converter. It is appreciated that other types of topologies and configurations of switching regulators may be employed in different embodiments. Furthermore, it is noted that although a flyback converter topology is described in the context of an example switching power converter, it is appreciated that the teachings provided herein may also apply to other technologies, e.g., other applications that may involve inductive load switching, or the like.

As shown, switching power converter 100 includes a rectifier 102 coupled to receive an externally-generated ac input voltage, $V_{AC}$, applied across input terminals 114. In the example shown, rectifier circuit 102 is a full bridge rectifier comprising four diodes that produce a full-wave rectified voltage, $V_{RECT}$, across input capacitor $C_F$ coupled between node 111 and node 112 (i.e., ground potential). In one example, input voltage, $V_{AC}$, may be an ordinary ac line voltage (e.g., 85V-265V between 50-60 Hz).

As shown, an energy transfer element 125, which includes an input winding 175 and an output winding 176, is coupled between ac rectified voltage $V_{RECT}$ provided at node 111 at an input side of switching power converter 100 and load 165 at an output side of power converter 100. In one example, energy transfer element 125 may be used to galvanically isolate the input side and output side of switching power converter 100. As further shown, a power switch 120 is coupled to primary winding 175 to regulate the transfer of energy from node 111 to load 165. In one embodiment, power switch 120 is a power metal oxide semiconductor field effect transistor (MOSFET). An input filter capacitor 185 is shown coupled across node 111 and a ground potential node 112. It is appreciated by one skilled in the art that when input filter capacitor 185 is a small capacitance, ac rectified voltage $V_{RECT}$ maintains a substantially sinusoidal shape which may allow for higher power factor correction.

In operation, controller 145 is coupled to generate a pulsed drive signal $U_{DRIVE}$ 156 that is coupled to control switching of power switch 120 in response to control signal $U_{CON}$ 157. In one example, controller 145 is implemented on a monolithic device. In another example, power switch 120 and controller 145 are integrated together in a single monolithic device inside of a package 158. In one example, package 158 is a four terminal package that includes controller 145 and power switch 120 and may be capable of regulating an output current and simultaneously implementing power factor correction. More specifically, a first terminal may be coupled to the drain of power switch 120, a second terminal may be coupled to the source of power switch 120, a third terminal may be coupled to receive control signal $U_{CON}$ 157 for multiple functions, and a fourth terminal may be coupled to receive a supply voltage VSUPPLY from a bypass capacitor 183.

As shown, drive signal $U_{DRIVE}$ 156 may be a rectangular pulse waveform with logical high and low periods generated by controller 145 wherein the logic high value corresponds to a closed switch and a logic low corresponds to an open switch. As is appreciated by persons of skill in the art, the switching frequency of power switch 120 and a peak value of a switch current $I_{SW}$ determines the amount of energy transferred to load 165 and may be adjusted by controller 145 to regulate power to the output of power converter 100.

As shown, a clamp circuit 110 is coupled to the primary winding 175 of the energy transfer element 125 to control the maximum voltage on power switch 120. In operation, power switch 120 produces pulsating currents through diode 130 that is filtered by output capacitor 135 to produce a substantially constant output current $I_{OUT}$ at load 165. Output capacitor 135 is coupled between one end of secondary winding 176 of energy transfer element 125 and the cathode of diode 130. The anode of diode 130 is shown coupled to the other end of secondary winding 176. According to one embodiment, capacitor 135 is a non-electrolytic capacitor with a relatively small capacitance. Although a ripple on the output current is produced with greater amplitude with a small capacitance value for capacitor 135, the controller may chop off or limit the amplitude of the output current at a certain output current threshold by implementing a cycle by cycle switching scheme. This results in limiting the peak value of the output current $I_{OUT}$ through load 165 which may in turn limit the amount of heat generated by load 165 (such as an LED), thereby increasing the longevity of load 165.

The output signal that is regulated is generally shown in FIG. 1 as output signal $U_O$, which may be an output voltage $V_{OUT}$, output current $I_{OUT}$, or some combination of the two. In operation, a feedback circuit 160 receives output signal $U_O$ and produces a control signal $U_{CON}$ 157 that is input to controller 145 via a control terminal 147. In one example, control signal $U_{CON}$ 157 may be representative of a feedback signal that regulates an output current $I_{OUT}$. Feedback circuit 160 may comprise any one of the many known mechanisms/circuits used to measure output current $I_{OUT}$, including, without limitation, a current transformer, a voltage across a resistor, or a voltage across a transistor when the transistor is conducting.

As further shown, an external command circuit 162 is coupled to feedback circuit 160. In one example, external command circuit 162 may influence feedback circuit 160 to change the value of control signal $U_{CON}$ 157 by an external command signal $U_{EXT}$ 163. For example, external command circuit 162 may output external command signal $U_{EXT}$ 163 such that the value of control signal $U_{CON}$ 157 changes and controller 145 temporarily inhibits switching of power switch 120 to allow power converter 100 to perform PWM dimming. In other words, in the case where load 165 comprises a light element (e.g., one or more LEDs), external command circuit 162 may generate an external voltage or signal (e.g., a user input, or a high output voltage) in a range that changes the value of control signal $U_{CON}$ 157 to direct controller 145 to change functionality from a normal closed loop feedback mode of operation to a pulse width modulated (PWM) dimming operation with respect to the LED load.

Figure 2:
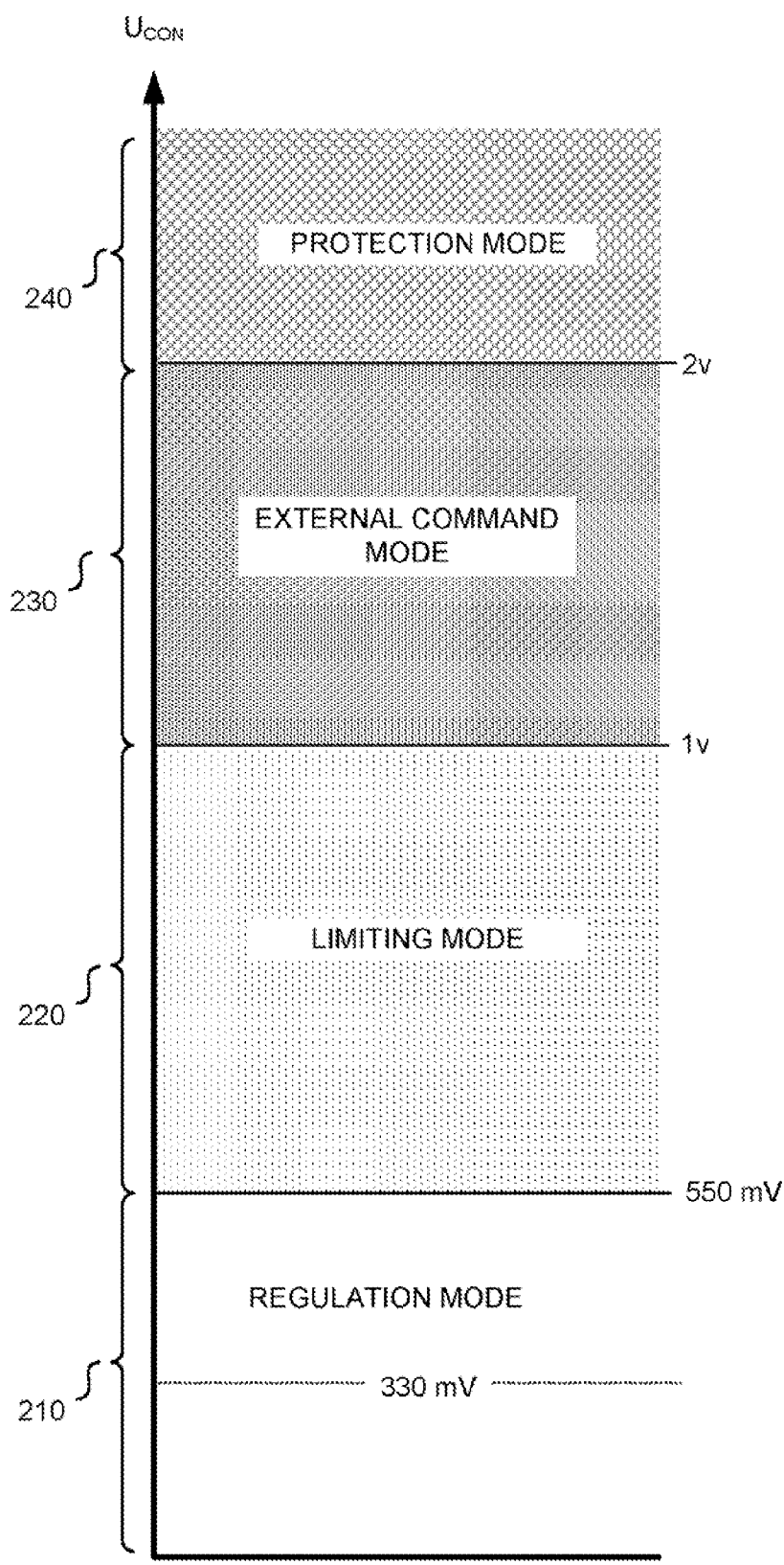
FIG. 2 illustrates an example graph or chart that shows multiple distinctive operating modes or functions for the controller shown in FIG. 1 depending on voltage of a control signal.

FIG. 2 illustrates an example graph or chart that shows multiple distinctive operating modes or functions for controller 145 in power converter 100 in FIG. 1 depending on the voltage of a control signal $U_{CON}$ 157 being received through external control terminal 147. In a first operating mode, also referred to as the regulation mode (shown as voltage zone 210), controller 145 may utilize a PFG switching scheme while regulating. More specifically, in voltage zone 210 controller 145 may maintain a constant duty cycle and a constant switching period over a half line cycle of the ac rectified voltage $V_{AC}$. More specifically, the switching period may be defined as a specific time period that subsequently repeats, and the duty cycle may be defined as the ratio of the time power switch 120 is able to conduct, over the switching period. The switching frequency, the rate at which power switch 120 switches, may be adjusted for every half line cycle by adjusting the switching frequency in response to output signal $U_O$ in order to regulate output current $I_{OUT}$. In another example, the duty cycle of power switch 120 may be adjusted in response to output signal $U_O$ in order to regulate output current $I_{OUT}$. According to the following example, the switching frequency and/or duty cycle may be adjusted for the subsequent half line cycle based on the output signal $U_O$ for the previous half line cycle. In this manner, controller 145 regulates the output current $I_{OUT}$ and simultaneously employs power factor correction. It will be appreciated that the switching scheme used in regulation mode 210 allows for power factor correction when using a flyback topology converter in a discontinuous mode of operation. In a specific embodiment, controller 145 may include a counter that counts when control terminal 147 is above a 300 mV threshold and may count down when control terminal 147 is below the 300 mV threshold during a half line cycle. Based on the resultant count, controller 145 can adjust switching frequency or duty cycle during the next half line cycle to regulate output current $I_{OUT}$.

In a second operation mode, referred to as a limiting mode (shown as voltage zone 220), controller 145 employs another switching scheme to limit output current $I_{OUT}$ to a maximum value. This operation mode may be useful when the output capacitor 135 of FIG. 1 is a low value capacitor and the output current may exceed a second threshold (550 mV) only during a portion of the half line cycle due to the peak of ac rectified voltage $V_{RECT}$. In this operation mode, controller 145 may use a cycle by cycle or cycle skipping control scheme to enable or disable power switch 120 during a switching period to limit control signal $U_{CON}$ 157 from exceeding 550 mV. In other words, when controller 145 is operating in a limiting mode controller 145 determines if power switch 120 should switch during each switching cycle. During this switching scheme power factor correction may deteriorate. Power converter 100 may also operate in limiting mode to temporary limit excessive power being delivered to the output in the event of an input line voltage surge. In the limiting mode of operation the output load is protected from excessive electrical/thermal stress.

In a third operation mode, referred to as an external command mode (shown as voltage zone 230), controller 145 switches power switch 120 in response to external signal $U_{EXT}$ 163. According to the example in FIG. 2, controller 145 operates in external command mode when control signal $U_{CON}$ 157 is between 1 V and 2 V. In one example, when controller 145 is operating in external command mode, controller 145 inhibits switching to perform a PWM dimming of load 165. More specifically, the feedback state of controller 145 is not interrupted when external command signal $U_{EXT}$ 163 is received. When control terminal 147 drops below voltage zone 230 controller 145 resumes switching in response to state of feedback prior to control terminal 147 entering voltage zone 230. In external command mode, controller 145 operates in an open loop mode. In other words, controller 145 operates independently of load 165. In one example, external signal $U_{EXT}$ 163 may be sent to another portion of power converter 100.

In a fourth operation mode, referred to as a protection mode (shown as voltage zone 240), controller 145 latches off power switch 120. In other words, when control terminal 147 rises above ~2V into zone 240, controller 145 turns power switch 120 off and does not restart switching. As shown, protection mode may be useful in the event of a fault condition, such as when load 165 is shorted.

Figure 3A:
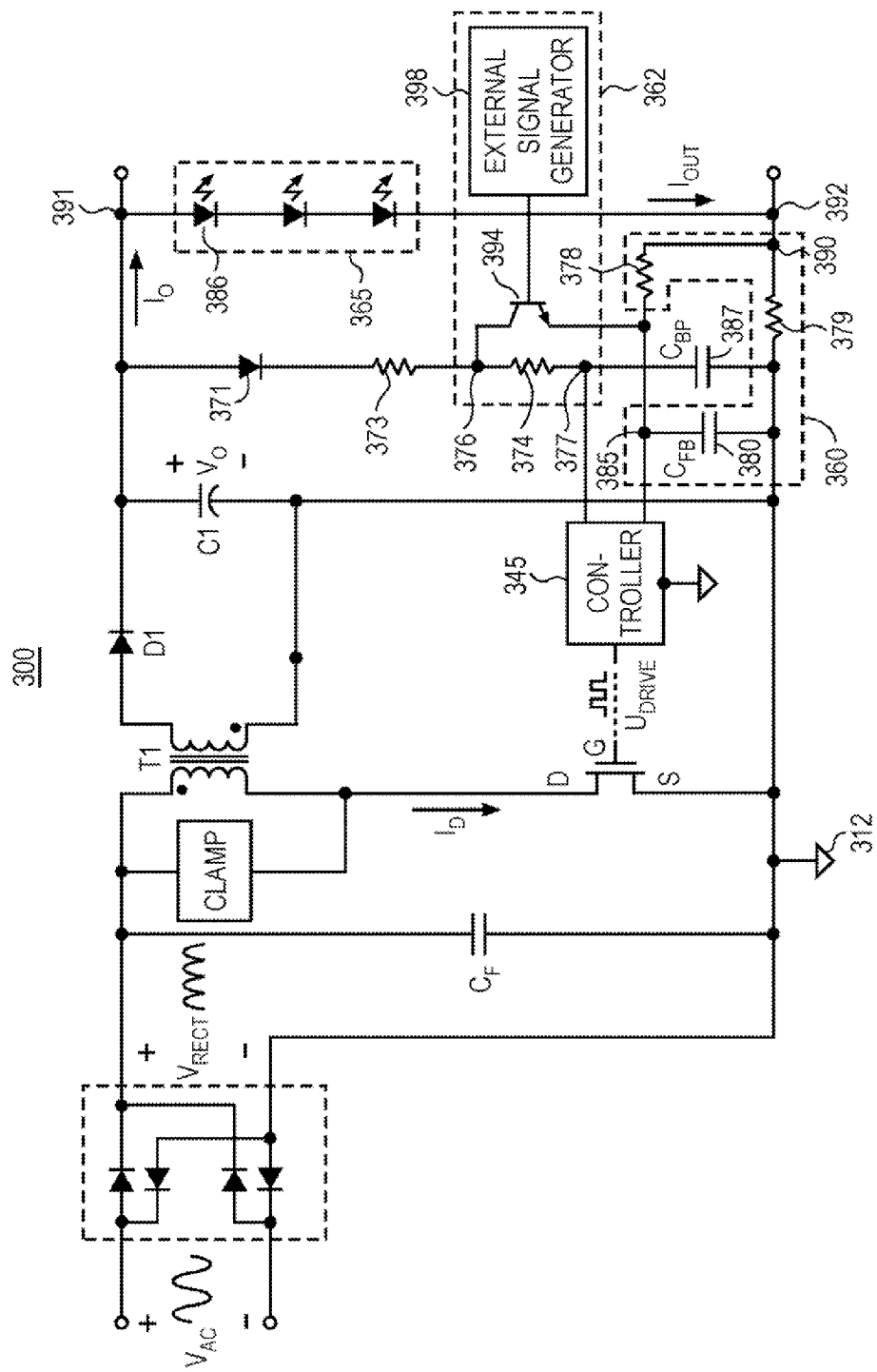
FIG. 3A illustrates an example detailed circuit schematic diagram of a switching power converter.

FIG. 3A illustrates an example detailed circuit schematic diagram of a switching power converter circuit 300 that is similar to power converter circuit 100 of FIG. 1, and further shows an example feedback circuit 360 and an example external command circuit 362 in more detail. Also, a load 365 illustrates a set of coupled LEDs 386 in series and coupled between output terminals or nodes 391 & 392. As shown, feedback circuit 360 is shown including a feedback capacitor $C_{FB}$ 380 coupled between ground potential 312 and node 385. In one example, node 385 may be representative of a control signal $U_{CON}$ received by controller 345. Feedback circuit 360 also includes a sense resistor 378 coupled between node 385 and a node 390, and a resistor 379 coupled between node 390 and ground potential 312. Resistors 378 & 379 implement a network that senses the output current $I_{OUT}$ flowing through LEDs 386 and provide a feedback voltage at node 385 input to controller 345.

In the example of FIG. 3A external command circuit 362 is shown comprising external signal generator 398, which functions to drive NPN transistor 394 on and off. In one example, external signal generator may generate a signal to perform an open loop function independent of regulating the output current. In one example, external signal generator outputs a signal that indicates to controller 345 to inhibit switching of power switch 120. As shown, the collector of NPN transistor 394 is coupled to node 385. A resistor 373 is coupled in series with diode 371 between node 391 and node 376. As further shown, resistor 374 is coupled between node 376 and a bypass input to controller 145 at node 377. A bypass capacitor 387 is shown coupled between nodes 377 and ground node 312. In operation, when a certain particular voltage at the base of transistor 394 is applied, node 385 is pulled up to approximately the voltage applied to the base minus a threshold voltage. For example, if the voltage applied to the base of NPN transistor 394 is 2 V, and the base-collector threshold voltage is 0.6 V, then the voltage at node 385 is 1.4 V and controller 345 enters into voltage zone 230. In this manner, external signal generator 398 directs controller 345 to begin operating in an open loop mode in which the output current $I_{OUT}$ through load 365 is pulsed at a certain duty factor or duty cycle. Changing the duty cycle of the pulsating current through LEDs 386 varies the intensity of light. This operation is completely independent of output current $I_{OUT}$ through load 65, and may be controlled external of controller 345 (e.g., external command circuit 362).

Figure 3B:
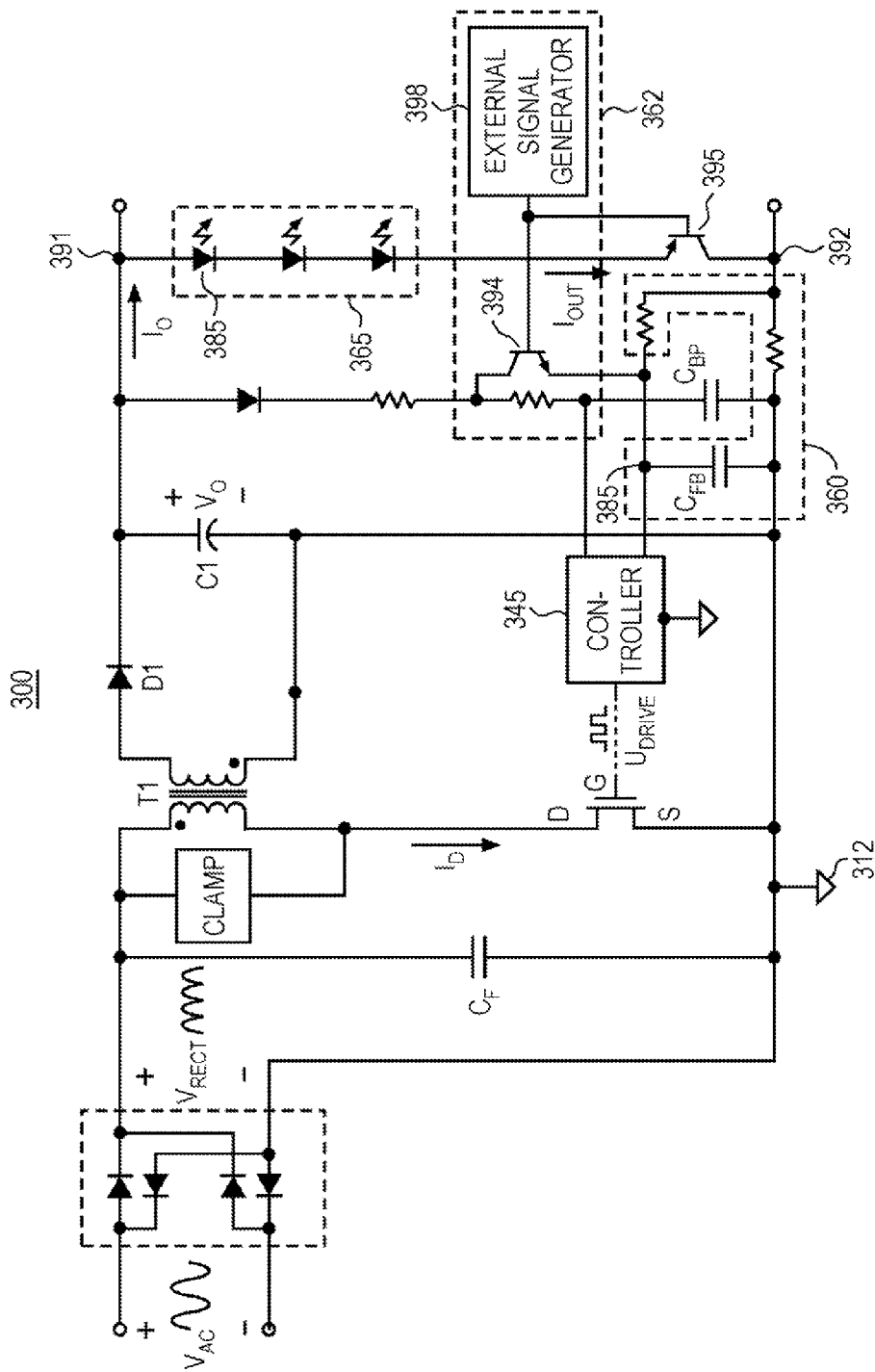
FIG. 3B illustrates an example detailed circuit schematic diagram of the switching power converter of FIG. 3A with a switching load.
Figure 4:
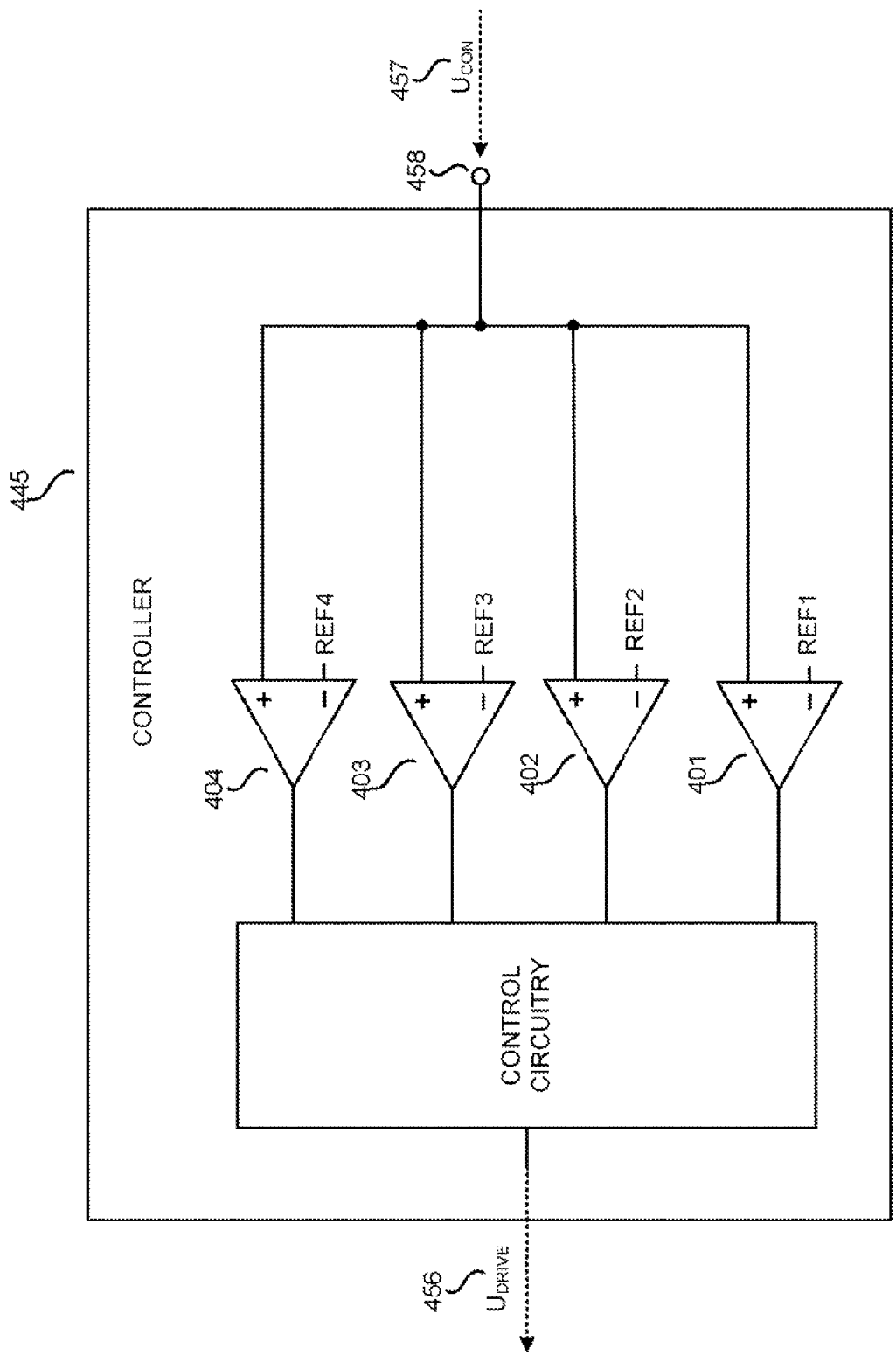
FIG. 4 illustrates an example controller of a switching power converter.

FIG. 3B shows the example power converter 300 of FIG. 3A including an additional PNP transistor 395 coupled in series with load 365. In one example, external signal generator 398 may output an additional signal to prevent output current $I_{OUT}$ from conducting. As shown, the emitter of PNP transistor 395 is coupled to load 365. The collector of PNP transistor 395 is coupled to output node 392. In operation, when external signal generator 398 outputs a high voltage to the gates of transistors 394 & 395, NPN transistor 394 turns on and PNP transistor 395 turns off simultaneously. This interrupts the flow of output current $I_{OUT}$ through load 365 and signals controller 345 to inhibit switching of power switch 120. In one embodiment, this mode of operation is initiated when the voltage at node 385 is within a range of 1-2 V Referring now to FIG. 4, an example controller 445 is shown in further detail in accordance with the teachings of the present invention. It is appreciated that controller 445 may be one example of controller 145 in FIG. 1 and/or controller 345 in FIGS. 3A and 3B. As shown, controller 445 includes a first comparator 401, a second comparator 402, a third comparator 403, a fourth comparator 404, and control circuitry 405. In operation, control signal $U_{CON}$ 457 is received by control terminal 458. Comparators 401, 402, 403 and 404 output an output signal in response to receiving control signal $U_{CON}$ 457. As shown, comparators 401, 402, 403, and 404 outputs a high or low signal if control signal is higher than a particular reference. For example, comparator 401 will output a high signal if control signal $U_{CON}$ 457 is greater than REF1. According to one example, REF1 may be approximately equal to 300 mV, REF 2 may be approximately 550 mV, REF3 may be approximately equal to 1 V, and REF 4 may be approximately equal to 2 V. In operation, control circuitry 405 outputs a drive signal $U_{DRIVE}$ 456 that controls the switching of a power switch 120 in response to receiving output signals from comparators 401, 402, 403 and 404. In another example, control signal $U_{CON}$ 457 may be a current and comparators 401, 402, 403 and 404 may be current comparators.

Although the present invention has been described in conjunction with specific embodiments, those of ordinary skill in the arts will appreciate that numerous modifications and alterations are well within the scope of the present invention. Accordingly, the specification and drawings are to be regarded in an illustrative rather than a restrictive sense,

We claim:

1. A power converter for delivering an output signal to a load, the power converter comprising:
   an energy transfer element having an input side and an output side, the input side for coupling to an ac line voltage and the output side for coupling to the load;
   a power switch coupled to a primary winding of the energy transfer element for regulating a transfer energy of the output signal delivered to the load;
   a controller that generates a pulsed drive signal having a frequency in response to a control signal, the pulsed drive signal being coupled to control switching of the power switch such that the frequency determines the transfer energy;
   a feedback circuit coupled to receive the output signal and a command signal, in response thereto the feedback circuit generating the control signal coupled to the controller;
   wherein when the control signal is within a first range the controller operates in a closed loop feedback mode such that the output signal is regulated at a certain value, when the control signal is in a second range, the controller operates in a limiting mode in which the controller limits the output signal to a maximum value, when the control signal is in a third range, the controller operates in an open loop mode in which the command signal implements a pulse width modulation (PWM) dimming operation with respect to the output signal delivered to the load, and when the control signal is in a fourth range, the controller a operates in a protection mode in which the controller turns the power switch off and does not restart switching.

2. The power converter of claim 1 wherein the power switch and the controller are integrated together in a single monolithic device.

3. The power converter of claim 2 wherein the power switch comprises a high-voltage MOSFET and the single monolithic device is housed in a four-terminal package, a first terminal coupled to a drain of the high-voltage MOSFET, a second terminal coupled to a source of the high-voltage MOSFET a third terminal for coupling to the control signal, and a fourth terminal for coupling to a supply voltage.

4. The power converter of claim 1 wherein the energy transfer element includes a secondary winding for coupling across the load.

5. The power converter of claim 1 wherein the pulsed drive signal comprises a waveform with first and second logic values, the first logic value driving the power switch to a closed switch state and the second logic value driving the power switch to an open switch state.

6. The power converter of claim 1 wherein the output signal comprises an output current.

7. The power converter of claim 1 wherein the primary winding of the energy transfer element and the power switch are coupled in series.

* * * * *